May 26, 1936.                    N. ROACH                    2,042,125
                                 COUPLING
                             Filed Aug. 19, 1935
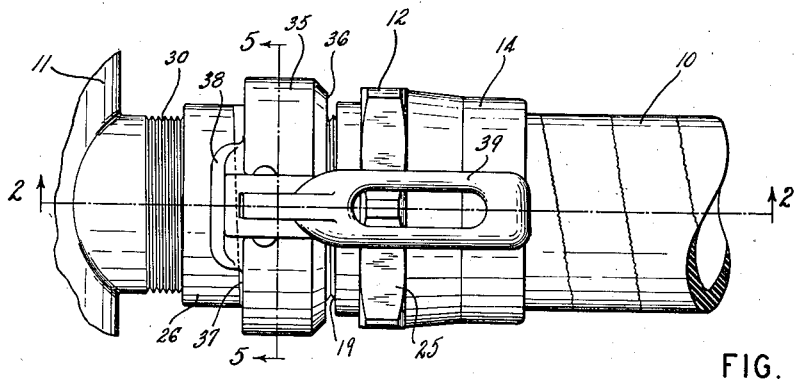
FIG. —1
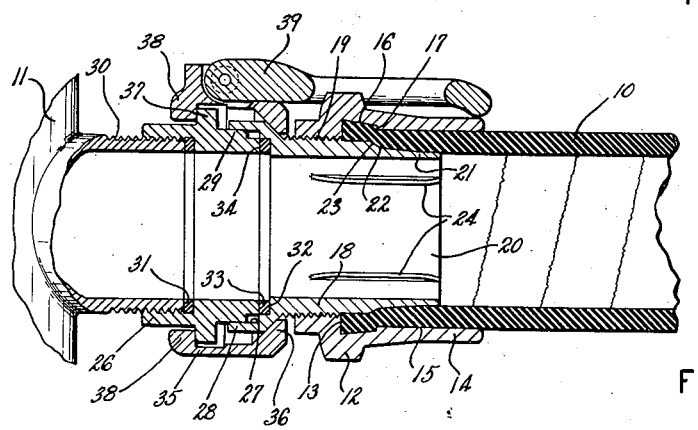
FIG. —2
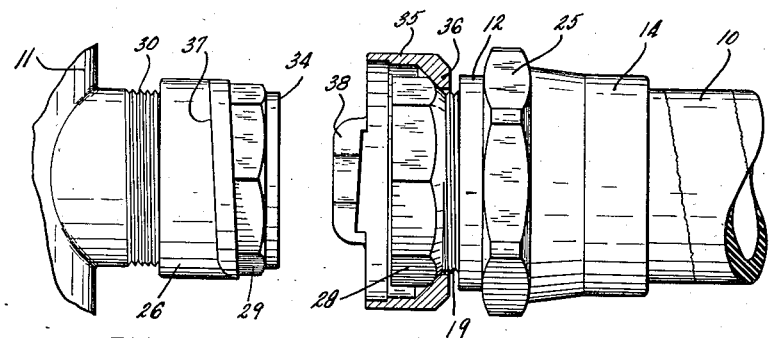
FIG. —3                                          FIG. —4
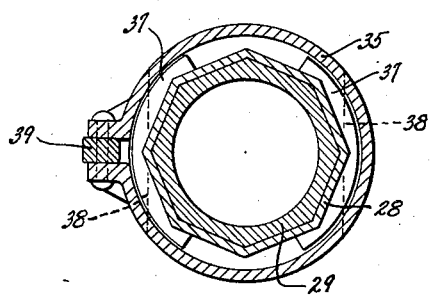
FIG. —5
INVENTOR
NATHAN ROACH
BY
ATTORNEYS Patented May 26, 1936

2,042,125

UNITED STATES PATENT OFFICE 2,042,125

COUPLING

Nathan Roach, Cleveland, Ohio, assignor to The Cleveland Brass Manufacturing Company, Cleveland, Ohio, a corporation of Ohio Application August 19, 1935, Serial No. 36,819

1 Claim. (Cl. 285—177)

This invention relates to a coupling and more particularly to a device for coupling hose.

My invention provides a novel quickly detachable coupling which includes a coupling member rotatable relative to the members coupled and which provides against the accidental unlocking of the coupling due to twisting of the coupled members.

Another feature of my invention is the provision of a novel arrangement for securing the end of a hose in a coupling member.

My invention also provides a novel construction which utilizes one member for securing a hose to a coupling device and utilizes the same member for coupling the hose in its connections to another fitting.

Other novel features will become apparent from the accompanying specification when taken in connection with the drawing and the essential features will be summarized in the claim.

In the drawing Fig. 1 is a general view showing the various parts of my improved coupling as applied to a hose; Fig. 2 is a sectional view taken centrally through Fig. 1 along the line 2—2 thereof; Figs. 3 and 4 show the parts of Fig. 1 when disconnected and with the clamping collar shown in section; while Fig. 5 is a transverse sectional view taken along the line 5—5 of Fig. 1.

While certain features of my invention may be utilized in connection with conduits other than hose, I have chosen to illustrate the same as applied to a hose 10 which is to be coupled with another fitting such for instance as that illustrated at 11. The connection to the hose proper provides two parts which are quickly secured together in a manner to hold the end of the hose very tightly to the connecting members designed to attach the hose to other parts. This portion of the coupling comprises a collar 12 which has a shoulder 13 adapted to at least partially abut the end of the hose 10. The collar has a skirt portion 14 whose inner surface 15 substantially corresponds to the outer wall of the hose with which it is to be used. Adjacent the shoulder 13 the collar is provided with an annular recess 16 which preferably extends but a short distance longitudinally of the collar and ends in an annular shoulder 17 spaced from the shoulder 13. In the form shown the recess decreases in depth from the shoulder 13 to the shoulder 17 as best seen in Fig. 2. Preferably the shoulder 17 where it joins the surface 15 is formed in a manner to grip the outer wall of the hose in a very positive manner. To this end I have made the shoulder 17 very sharp. A member 18 coacts with the collar to clampingly secure the end of the hose therein. This member has a threaded connection 19 with the collar and has a sleeve portion 20 which extends inside the hose when the threads are engaged. This sleeve portion has a thin wall 21 at its inner end which substantially conforms to the inner surface of the hose. The wall then tapers to the point 22 gradually becoming thicker and at the point 23 the member 18 is provided with an annular shoulder formed in a manner to wedge and clampingly secure a portion of the hose against the shoulder 17 when the threads 19 are turned down in the manner shown in Fig. 2 which brings the shoulder 23 almost but not quite opposite the shoulder 17. I find that this arrangement for securing the hose in its end fittings is very easily constructed and very efficient in its operation as the hose when tested stands a severe strain without being pulled out of its connections and this without any tearing of the hose at the point where it is most tightly clamped. The member 18 may be provided with suitable splines 24 on its inner surface to accommodate a wrench for tightening the parts. In a like manner the collar 12 may be provided with surfaces 25 to accommodate a wrench.

While the construction just described may be utilized for securing any connecting member to a hose, I have illustrated the same as part of an additional coupling for quickly attaching or detaching the conduit member 10 to and from the fitting 11. To this end the member 18 is formed at its outer end to provide a female coupling member, a second or male coupling member 26 is secured to the fitting 11, and quickly detachable means is provided for clamping these two coupling members together to form a fluid-tight joint. In the construction shown the interfitting ends of the two coupling members are formed in a manner so that one has a recess and the other projects within the recess and the parts are arranged so that relative longitudinal movement between the ends is permitted but when these ends are engaged relative rotative movement between the two coupling members is prevented. In the form shown the coupling member formed on the member 18 provides a recess 27 formed by the upstanding walls 28 which are preferably in polygonal form as best seen in Fig. 5 to accommodate a wrench which may be used to manipulate the member 18. The coupling member 26 has an end 29 also polygonal in form and complementary to the recess 27 so that it fits fairly snugly in the recess. The faces of the end 29 also serve to accommodate a wrench for manipulating the member 26 in attaching it to the fitting 11 as for instance by the interengaged threads 30. A gasket 31 would normally be provided between the parts 11 and 26 to form a fluid-tight joint.

The coupling members 26 and 18 are so formed at their ends as to form a fluid-tight joint between them when the ends are brought together. For this purpose I provide a shoulder or recess 32 on the member 18 which accommodates a gasket 33 and the end of the member 26 provides a flat shoulder 34 which engages the gasket when the coupling members are clamped together.

Various means may be utilized to clampingly secure the coupling members together but in the form shown I provide a collar 35, one end of which at 36 engages behind the end 28 of the member 18. It will be obvious from a consideration of the various views that the collar 35 is placed upon the member 18 before the threads 19 engage with the collar 12. The clamping collar 35 is thus rotatably secured on the member 18 in spaced relation to the end of the collar 12 so as to permit slight movement of the collar longitudinally of the member 18. The other end of the collar and the coupling member 26 are formed in a manner to provide a bayonet joint lock between these two parts when the collar 35 is rotated relative to the coupling members. To this end the coupling member 26 is provided with a plurality of cam or shoulder surfaces 37 which are inclined longitudinally of the coupling member with the cam surfaces extending in a circumferential path. The coupling collar 35 in turn is provided with upstanding lug portions 38 which are adapted to pass in the circumferential space between the parts 37 and to overlie the surfaces 37 and cam the coupling members together upon rotation of the collar 35 relative to the coupling members. A handle 39 may be secured to the collar 35 for manipulating the same.

It results from the construction just described that the coupling members 18 and 26 may be placed with the end 27 within the recess 28 and the collar 35 is then moved toward the left as shown in Figs. 1 to 4 until the portions 38 overlie the portions 37 and thereafter a partial rotation of the collar 35 will clampingly secure the coupling members together making a substantially fluid-tight joint between the end 34 and the shoulder 32. Because of the nature of the connection between the parts 27 and 28 twisting the hose will not have a tendency to disconnect this coupling but the same will remain in place until the collar 35 is positively moved in the unclamping direction.

What I claim is:

In a coupling, two coupling members, each having a threaded portion by which it may be secured to another fitting, said members having interfitting male and female ends having formed thereon integral complementary polygonal surfaces arranged to permit relative longitudinal movement and to prevent relative rotative movement between them, there being an annular recess in said female end, a gasket in said recess in position to engage said male end when said ends are in abutting relation, each interfitting end being formed to accommodate a wrench for manipulation of said members to engage the threaded portions thereof, a collar rotatably secured to one of said members and having a bayonet joint lock with said other member, and said lock including inclined shoulder portions on said other coupling member and lugs on said collar having inclined surfaces adapted to overlie and to coact with said inclined shoulder portions to clamp said male end firmly against said gasket upon collar rotation.

NATHAN ROACH.